United States Patent
Kumar et al.

(10) Patent No.: US 6,917,999 B2
(45) Date of Patent: Jul. 12, 2005

(54) PLATFORM AND METHOD FOR INITIALIZING COMPONENTS WITHIN HOT-PLUGGED NODES

(75) Inventors: Mohan J. Kumar, Aloha, OR (US); Shivnandan D. Kaushik, Portland, OR (US); James B. Crossland, Banks, OR (US); Linda J. Rankin, Portland, OR (US); David J. O'Shea, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 482 days.

(21) Appl. No.: 09/895,692

(22) Filed: Jun. 29, 2001

(65) Prior Publication Data

US 2003/0005200 A1 Jan. 2, 2003

(51) Int. Cl.[7] .............................................. G06F 13/00
(52) U.S. Cl. ...................... 710/302; 710/300; 710/301
(58) Field of Search .................... 710/300–309, 710/8–19, 311–317; 713/1–2, 100; 709/201–203, 208–219, 227, 229; 711/147–153, 170–175

(56) References Cited

U.S. PATENT DOCUMENTS

| | | | | |
|---|---|---|---|---|
| 5,617,537 A | * | 4/1997 | Yamada et al. ............. 709/100 |
| 5,710,907 A | * | 1/1998 | Hagersten et al. .......... 711/144 |
| 5,778,202 A | * | 7/1998 | Kuroishi et al. ............ 710/306 |
| 5,862,350 A | | 1/1999 | Coulson |
| 5,938,765 A | * | 8/1999 | Dove et al. ..................... 713/1 |
| 6,081,874 A | * | 6/2000 | Carpenter et al. .......... 711/141 |
| 6,216,185 B1 | * | 4/2001 | Chu ............................ 710/101 |
| 6,298,418 B1 | * | 10/2001 | Fujiwara et al. ............ 711/144 |
| 6,334,177 B1 | * | 12/2001 | Baumgartner et al. ........ 712/13 |
| 6,516,372 B1 | * | 2/2003 | Anderson et al. ........... 710/300 |
| 6,516,373 B1 | * | 2/2003 | Talbot et al. ................ 710/301 |
| 6,640,289 B2 | * | 10/2003 | McCrory et al. ........... 711/144 |
| 6,684,279 B1 | * | 1/2004 | Kruse et al. ................. 710/241 |
| 6,684,343 B1 | * | 1/2004 | Bouchier et al. .............. 714/4 |
| 6,718,415 B1 | * | 4/2004 | Chu ............................ 710/301 |
| 2002/0147941 A1 | * | 10/2002 | Gentile ........................ 714/36 |

* cited by examiner

Primary Examiner—Paul R. Myers
Assistant Examiner—Raymond N Phan
(74) Attorney, Agent, or Firm—Blakley, Sokoloff, Taylor & Zafman LLP

(57) ABSTRACT

One aspect of the invention relates to creation of a container object being part of software that is stored in platform readable medium and executed by a processor within a platform. The container comprises (i) a hardware identification object to identify to an operating system of the platform that a type of device represented by the container object is a node and (ii) a plurality of component objects to identify constituent components of the node. Another aspect of the invention is the distribution of BIOS to handle initiation of components of a substrate in response to hot-plug addition of that substrate.

25 Claims, 6 Drawing Sheets

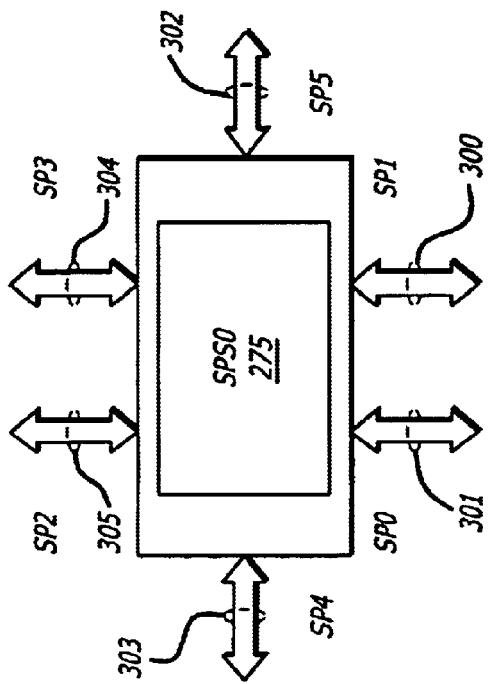
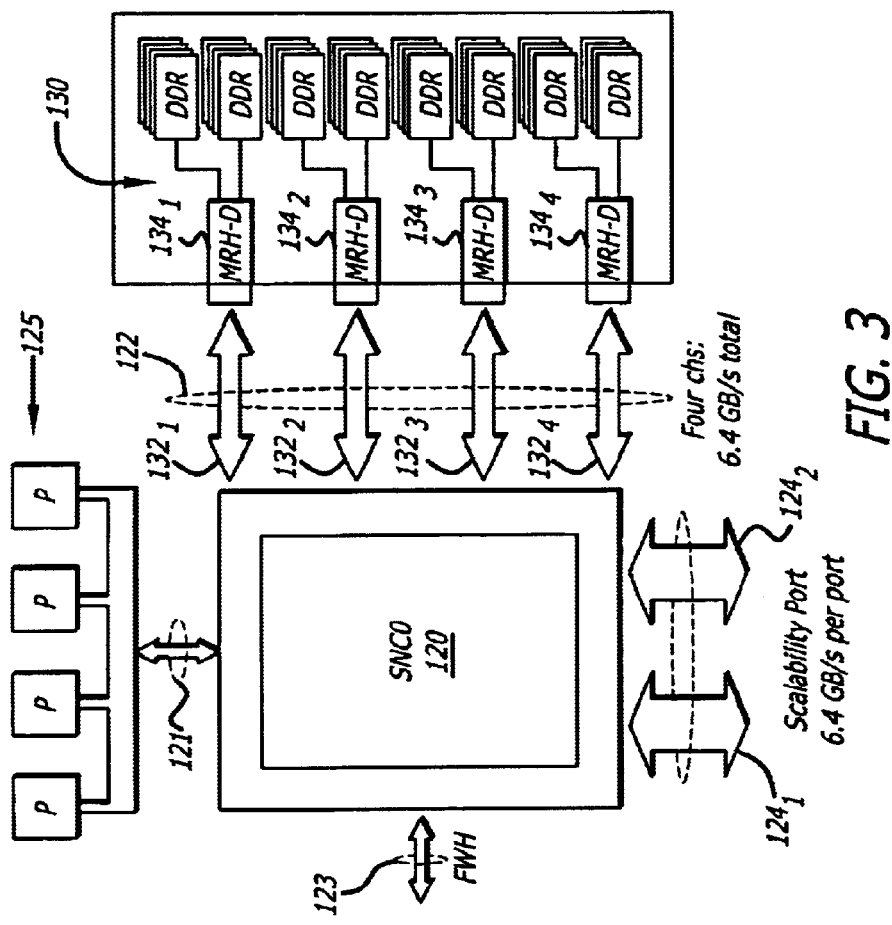

```
|_SB {
     Device(SNC0) {
         Name(_HID, "ACPI0004")   // Node Module Device
         Method(_STA)
         Method(_PXM) { ... }    // Proximity
         Processor(CPU0,0,0,0) {    //Processor Object
             Method(_MAT) { ... }
         }
         ...
         Processor(CPU3,0,0,0)         //Processor Object
         Device(MEM0) {         //Memory device
             Name(_HID,EISAID("PNP0C80"))
             Method(_CRS) { ... }
         }
         Method(_EJ0)                    610
     } //SNC0
     ...
}    // SB
```

PLATFORM AND METHOD FOR INITIALIZING COMPONENTS WITHIN HOT-PLUGGED NODES

FIELD

This invention relates to the field of computers. In particular, the invention relates to a platform employing a mechanism for representing and supporting a hot-plugged node and its constituent components as a collective unit to its operating system.

BACKGROUND

Advances in technology have opened up many opportunities for applications that go beyond the traditional ways of doing business. Electronic commerce over the Internet has become widely accepted, requiring many companies to either install one or more servers to host a web site and maintain accessible databases or to contract with data centers to provide such services. In addition to performance, important functional characteristics for these servers include reliability, availability and serviceability.

Normally, conventional server architectures feature both processors and memory coupled to a front-side bus. This conventional server architecture greatly hinders server performance due to a number of factors. For instance, one factor is that the front-side bus is non-scalable. Thus, as more processors and memory have access to the front-side bus, bandwidth constraints associated with that bus adversely effect overall server performance. Multi-node architectures where processors, memory and input/output (I/O) components are distributed across multiple interconnected nodes overcomes the limitations of front-side bus and enables building larger systems with scalable server performance.

Another factor is that any node, namely a primary component interconnected to a group of components (referred to as "constituent components"), may be hot-plugged to allow its addition or removal while the operating system (OS) of the server continues to operate. In order to provide a hot-plug solution, however, the constituent components must be represented and visible to the OS of the server. One option is to represent the constituent components, such as one or more processors and memories for example, separately in accordance with a platform firmware interface such as the Advanced Configuration and Power Interface (ACPI) Specification (Version 2.0) published Jul. 27, 2000. However, for those platforms supporting non-uniform memory access (NUMA) architectures, this separate representation poses a number of disadvantages.

For instance, one disadvantage is that the OS would not able to determine proximity relationships between nodes. In other words, the OS would not be able to determine which processor(s) and which memory are interconnected to the same node and adjacent to each other. Such proximity data, if available, would allow the OS to attempt to allocate memory for a processor from the same node in order to avoid time latency penalties caused by accessing memory that is remotely located from that processor.

Another disadvantage is that, during removal of a hot-plugged node, the OS is unable to simultaneously determine which components were removed with the node. Also, during addition of a hot-plugged node inclusive of a processor and memory, the OS of the server may initialize the processor prior to activation of the memory. Hence, the processor specific memory allocation may be inefficient because remotely located memory would be allocated to the processor before local memory is available. This would adversely impact overall server performance and further complicate removal of hot-plugged nodes.

Also, it is contemplated that processor(s) and memory of a node must be initialized to a known state before the OS is made aware of them. When the node is hot-plugged and separate from the substrate maintaining the Basic Input/Output System (BIOS), the BIOS cannot be used for initialization of the processor(s) and memory. One reason is that when the platform under control of the OS, the OS only allows nodes to initiate non-coherent transactions until recognized by the OS. However, the hot-plugged node need to initiate coherent (memory) transactions to reprogram registers to enable various communication ports and links.

BRIEF DESCRIPTION OF THE DRAWINGS

The features and advantages of the present invention will become apparent from the following detailed description of the present invention in which:

FIG. 3 is an exemplary embodiment of a scalability node controller implemented within the platforms of FIGS. 1–2.

FIG. 4 is an exemplary embodiment of a scalability port switch implemented within the platforms of FIGS. 1–2.

FIG. 7 is an exemplary embodiment of representation of a container object that is representative of a node and generally consistent with ACPI standards.

DESCRIPTION

The invention relates to a platform and method for supporting and representing a hot-plugged node and its constituent components as a collective unit to its operating system (OS). The constituent components are initialized to a known state through a distributed BIOS mechanism before the OS is made aware of their presence. For this embodiment, the platform is configured with OS-directed device configuration and power management of both the node/components and the platform itself.

Herein, certain details are set forth in order to provide a thorough understanding of the invention. It is apparent to a person of ordinary skill in the art, however, that the invention may be practiced through many embodiments other that those illustrated. Well-known circuits and ACPI parameters are not set forth in detail in order to avoid unnecessarily obscuring the invention.

In the following description, terminology is used to discuss certain features of the present invention. For example, a "platform" includes hardware equipment and/or software that process data. One type of platform is a computer such as a server, although other types of hardware equipment may employ aspects of the invention. A "code segment" is a piece of software (e.g., code or instructions) that, when executed, performs a certain function. Software code is stored in platform readable medium, which may include any medium that can store or transfer information. Examples of the platform readable medium include an electronic circuit, a semiconductor memory device, a volatile memory (e.g., random access memory "RAM"), a non-volatile memory (e.g., read-only memory, a flash memory, etc.), a floppy diskette, a compact disk, an optical disk, a hard drive disk, a fiber optic medium, and the like.

In addition, a "device" is a single component or a collection of interconnected components that is also referred to as a "node". Herein, a node may be referenced and identified by its primary component. Each component may be an active device (e.g., integrated circuit, timing or clocking components, etc.), but it is contemplated that the invention may be applicable for use with passive components (e.g., resistors, capacitors, inductors, etc.). A "link" is broadly defined as any type of information-carrying medium such as electrical wire, optical fiber, cable, trace bus or even wireless signaling technology. In addition, the term "hot-plug" or any tense thereof indicates a characteristic where a device may be added, removed or replaced while the OS of the platform continues to operate.

I. Platform Hardware Architecture Overview with Distributed BIOS

Figure 1:
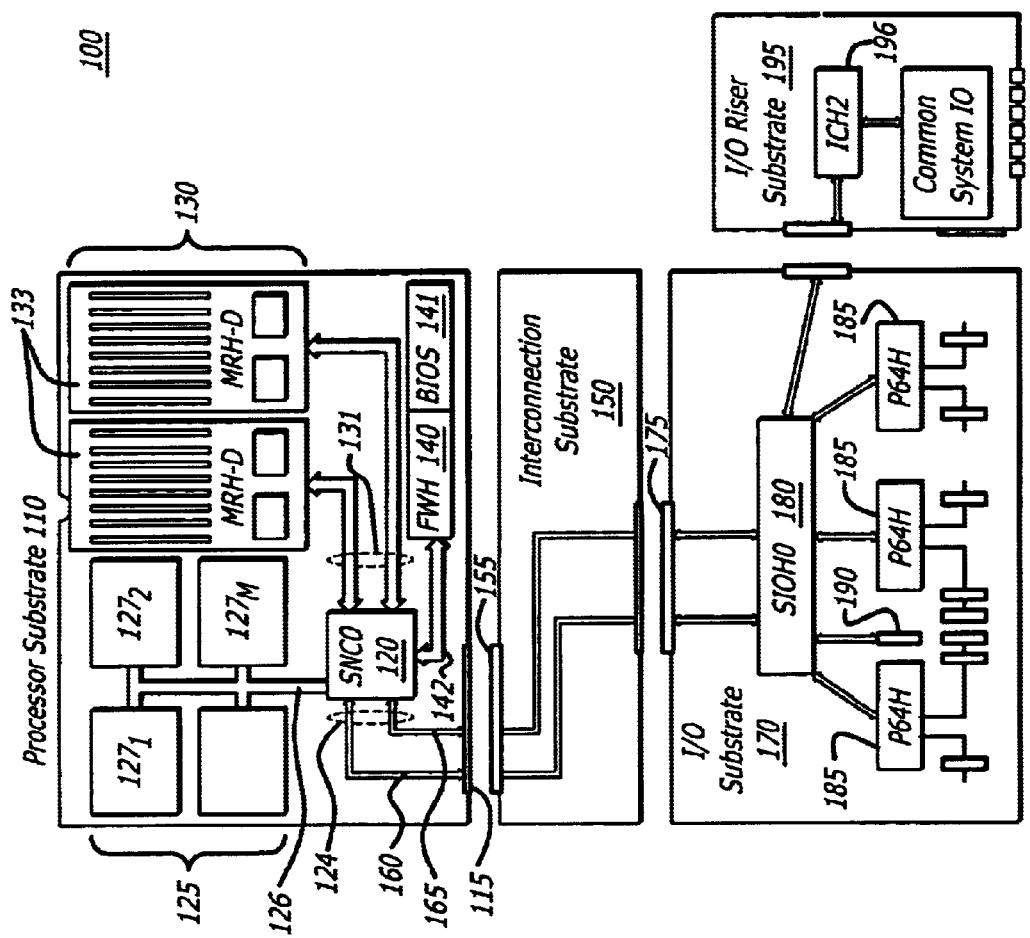
FIG. 1 is a first exemplary embodiment of a substrate layout for a platform utilizing the invention.

Referring to FIG. 1, a first exemplary embodiment of a platform utilizing the invention is shown. The platform 100 comprises a processor substrate 110, an input/output (I/O) substrate 170 and an interconnection substrate 150 that couples devices mounted on the processor substrate 110 with those on the I/O substrate 170. Each "substrate" is formed from any type of material or combination of materials upon which integrated circuits as well as a wide variety of other types of devices (e.g., passive, sockets, timing, etc.) can be attached. Each substrate may be produced in a number of form factors such as, for example, a circuit board acting as a motherboard or a removable daughter card.

Figure 2:
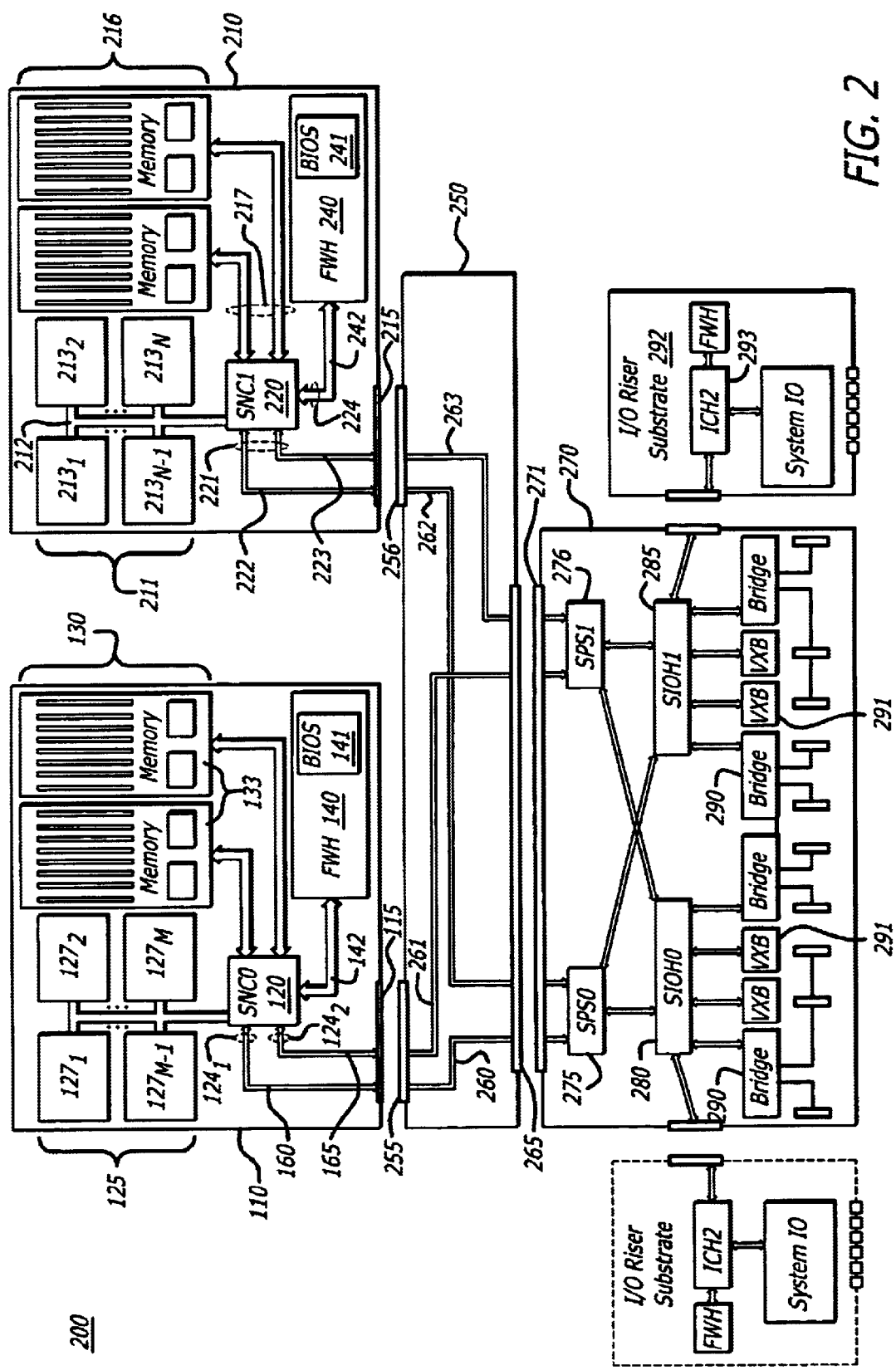
FIG. 2 is a second exemplary embodiment of a substrate layout of a platform utilizing the invention.

As shown, the processor substrate 110 comprises a first scalable node controller (SNC0) 120 that is configured with hot-plug capability as shown in FIG. 2. SNC0 120 is coupled to a connector 115 placed at an edge of the substrate 110. This connector 115 is adapted for coupling with a mating connector 155 placed on the interconnection substrate 150. SNC0 120 is further coupled to a processor cluster 125 supporting one or more processors $127_1$–$127_M$ ("M" being a positive integer), a local memory cluster 130 having one or more banks of memory 133 and a firmware hub 140. The firmware hub 140 is configured to store Basic Input/Output System (BIOS) 141 configured for partial initialization of components and enablement of links therefrom as described in FIG. 2 (hereinafter referred to as "INIT BIOS").

Referring still to FIG. 1, SNC0 120 features two scalability port interfaces 124 (see also FIG. 3) that are both coupled to connector 115 via links 160 and 165. This enables data to be routed from SNCO 120 to a Server Input/Output Hub (SIOH0) 180 via connectors 115 and 155 as well as connector 175 of I/O substrate 170. SIOH0 180 provides communications with high-speed links. For example, SIOH0 180 provides coupling to one or more bridges 185 (e.g., P64H2 devices) that support communications with one or more I/O buses such as a Peripheral Component Interconnect "PCI" bus and/or a higher speed PCI bus which is referred to as the "PCI-X bus" for example. SIOH0 180 further provides coupling to a virtual interface bridge (VXB) 190 (also referred to as "host channel adapter") and an I/O Riser substrate 195 having an input/output control hub (ICH2) 196 mounted thereon. The VXB 190 provides four 10-bit system I/O full-duplex channels. ICH2 196 supports a number of functions that are designed to support platform security in addition to traditional I/O and platform boot functions. ICH2 196 enables communications with a boot flash containing a system BIOS for booting the platform (not shown), networking ports as well as various I/O peripherals such as a mouse, alphanumeric keyboard, and the like (not shown).

Referring now to FIG. 2. a second exemplary embodiment of a multi-node platform utilizing the invention is shown. Platform 200 is configured to support multiple processor substrates that enable the M-way processor-based platform 100 of FIG. 1 to be converted to the M+N-way platform 200 as shown. For this embodiment, as shown, platform 200 comprises first processor substrate 110 and a second processor substrate 210, both coupled to a dual-substrate interconnection substrate 250. The dual-substrate interconnection substrate 250 is coupled to an I/O substrate 270.

More specifically, as shown in both FIGS. 2 and 3, first processor substrate 110 comprises SNC0 120 coupled to processor cluster 125, local memory cluster 130, firmware hub 140 and connector. SNC0 120 comprises a plurality of port interface that, when activated, enable communications over different links. For example, a processor port interface 121 of SNC0 120 provides a communication path to processors $127_1$–$127_M$ of processor cluster 125 via processor link 126. Memory port interface 122 of SNC0 120 provides a communication path to local memory cluster 130 via a memory link 131. In one embodiment, memory link 131 provides four communication sub-links $132_1$–$132_4$ supporting a total data throughput of approximately 6.4 Gigabytes per second (GB/s). Each of the sub-links $132_1, \ldots, 132_4$ may be coupled to a bank of local memory devices 133 (e.g., RDRAM) or a memory repeater hub $134_1, \ldots, 134_4$ that operates as an RDRAM-to-SDRAM translation bridge.

SNC0 120 further includes a first scalability port interface $124_1$ that enables a communication path over link 260 to a first scalability port switch (SPS0) 275 via connector 115 and mating connector 255. SNC0 also includes a second scalability port interface $124_2$ that enables a communication path over link 261 to a second scalability port switch (SPS1) 276 via connectors 115 and 255.

As further shown in FIGS. 2 and 3, SNC0 120 comprises a port interface 123 that enables a communication path to firmware hub 140 via link 142. Firmware hub 140 comprises INIT BIOS 141 that is configured to initialize processors $127_1$–$127_M$, local memory 133, and scalability port interfaces $124_1$ and $124_2$ to communicate with the OS. As a result, the distributed INIT BIOS 141 enables hot-plug addition of a boot node, namely first processor substrate 110, and supports dynamic partitioning of platform 200.

Similar in architecture to first processor substrate 110, second processor substrate 210 comprises a second scalable node controller (SNC1) 220 that is mounted on a substrate and coupled to a processor cluster 211, a local memory cluster 216, a firmware hub 240 as well as a connector 215. Connector 215 is adapted to couple with a second mating connector 256 of interconnection substrate 250.

As shown in FIG. 2, processor cluster 211 comprises a processor link 212 interconnecting one or more processors $213_1$–$213_N$ ("N" being a positive integer). It is contemplated that these N processors may equal in number to the M processors provided by first processor substrate 110, although such a 1:1 correlation is not necessary. Processor cluster 211 is coupled to a processor port interface of SNC1 220 via processor link 212. Local memory cluster 216 is coupled to a memory port interface of SNC1 220 through a memory link 217. SNC1 220 features two scalability port interfaces 221 that are both coupled to connector 215 via links 222 and 223.

As further shown in FIG. 2, SNC1 220 comprises a port interface 224 that enables a communication path to firmware hub 240 via link 242. Firmware hub 240 comprises INIT BIOS 241 that is configured to initialize processors $213_1$–$213_N$, local memory 218, and scalability port interfaces 222 and 223 to support communications with the OS when a hot-plugged operation occurs involving second processor substrate 110. The portion of INIT BIOS 241 enables hot-plug addition of another boot node (e.g., second processor substrate 210) and also supports dynamic partitioning of platform 200 as described in connection with FIGS. 5 and 6.

Referring still to FIG. 2, interconnection substrate 250 enables data to be propagated from SNC0 120 to both SPS0 275 and SPS1 276. In particular, first mating connector 255 receives data transferred through connector 115 and propagates that data over links 260 and 261. Links 260 and 261 are coupled to a connector 265 of interconnection substrate 250. Connector 265 may be coupled to a mating connector 271 of I/O substrate 270, which propagates the data from links 260 and 261 to SPS0 275 and SPS1 276, respectively. Similarly, in a redundant fashion, interconnection substrate 250 enables data to be propagates from SNC1 220 to SPS0 275 and SPS1 276 over links 262 and 263, respectively.

As shown in FIG. 4, in one embodiment, SPS0 275 and/or SPS1 276 is a crossbar switch (e.g., integrated 6×6 crossbar) that enables communication with components over six port interfaces 300–305. For example, with this embodiment, each scalability port switch would enable communications between four SNCs and two SIOHs. Both SPS0 275 and SPS1 276 are programmed by accessing internal control and status registers via PCI configuration interface, System Management Bus (SMBus) interface, or Joint Test Action Group (JTAG) interface.

Referring back to FIG. 2, I/O substrate 270 comprises SPS0 275 and SPS1 276, each coupled to a first Server Input/Output Hub (SIOH0) 280 and a second Server Input/Output Hub (SIOH1) 285. As previously described, both SIOH0 280 and SIOH1 285 provide communications with high-speed links. For example, SIOH1 285 provides coupling to one of more of the following: (1) one or more bridges 290 (e.g., P64H2 devices) that support communications with one or more I/O buses; (2) a virtual interface bridge (VXB) 291 that provides system I/O full-duplex channels; and/or (3) an I/O Riser substrate 292 having an input/output control hub (ICH2) 293 mounted thereon.

Besides system BIOS software retrieved via ICH2, various portions of INIT BIOS 141 are configured to reside in firmware hub 140 being coupled to SNC0 120. Likewise, various portions of the INIT BIOS 241 reside in firmware hub 240. As shown herein, both INIT BIOS 141 and/or 241 are implemented in a distributed fashion to assist in initialization without leaving such responsibility to the OS.

Herein, both INIT BIOS 141 and 241 may be responsible for electing their respective node boot strap processor to handle initial BIOS boot sequence operations for its specific substrate and enable communication path(s) to SPS0 275 and/or SPS1 276. For instance, INIT BIOS 141 enables the scalability port interfaces 124 and waits for Idle Flits from SPS0 275 and/or SPS1 276. Likewise, INIT BIOS 241 enables the scalability port interfaces 221 and waits for Idle Flits from SPS0 275 and/or SPS1 276.

During a normal boot of the platform 200, the node boot strap processors in turn elect the system boot strap processor which runs the system BIOS located in its respective FWH attached to ICH2 in order to complete the boot of the platform. Both INIT BIOS 141 and/or 241 is further configured to initialize the processors and memory on a hot-plugged node. For instance, INIT BIOS 141 is configured to initialize processors and memory associated with SNC0 120, which requires SNC0 120 to read the configuration state information from SPS0 275 and SPS1 276 using non-coherent accesses. Additionally, both INIT BIOS 141 and 241 program registers to indicate resources of the hot-plugged node (e.g., memory interleave registers to indicate memory of the new node) and to notify the OS of the presence of a fully initialized hot-plugged node.

For an 8-way platform featuring processor substrates 110 and 210 as shown, after successful boot of platform 200, the user may decide to remove various resources. For instance, platform 200 may undergo a hot-plug removal of a node featuring SCN0 120 mounted on first processor substrate 110. This may be accomplished by the OS transmitting an ejection notice for a container object that identifies SCN0 as well as its constituent components coupled thereto (see FIG. 7). Likewise, when undergoing a hot-plug addition of a node (e.g., SCN0 120 being the primary component), after initialization of its constituent components by the distributed INIT BIOS 141, the OS would bring local memory 133 online prior to processors $127_1$–$127_M$ so that such memory may be allocated to processors $127_1$–$127_M$ before selecting remotely located memory.

Dynamic partitioning can be defined as an ability to either split one R-way platform ("R" being a positive integer) into multiple smaller systems while the original OS continues to run without shutdown or merge multiple partitions into one larger partition while the original OS continues to run without shutdown. For example, using 8-way platform 200 of FIG. 2 for illustrative purposes, dynamic partitioning allows 8-way platform 200 to be split into two 4-way platforms 400 and 500 or an ability to merge two 4-way platforms 400 and 500 to form single 8-way platform 200. The dynamic partitioning operation occurs without requiring the OS to shutdown, namely reboot.

Figure 5:
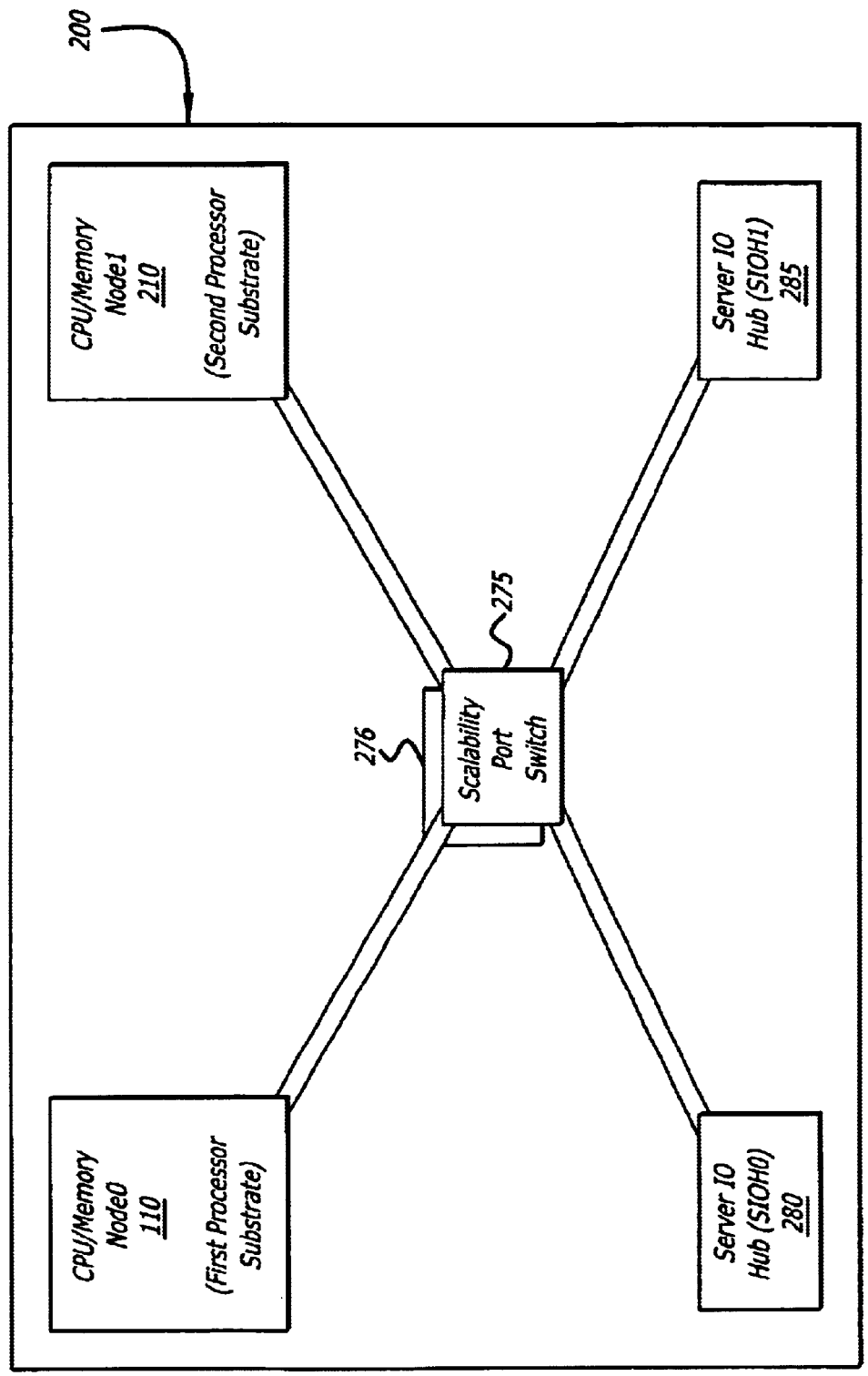
FIG. 5 is an exemplary embodiment of the platform of FIG. 2 prior to undergoing dynamic partitioning.
Figure 6:
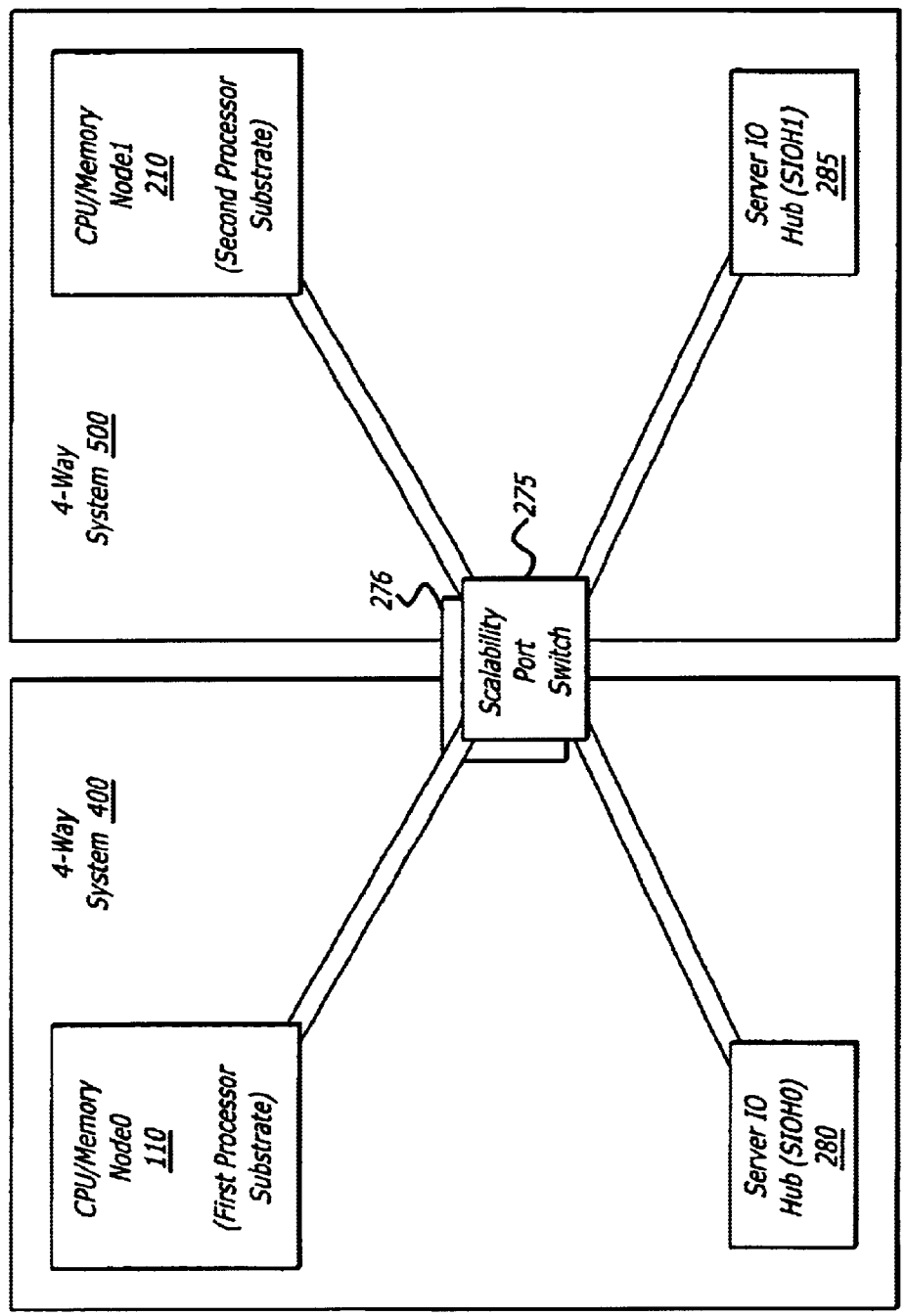
FIG. 6 is an exemplary embodiment of the platform of FIG. 2 after undergoing dynamic partitioning to produce two 4-way platforms.

Dynamic partitioning is accomplished by using the hot-plug capability. As shown in FIGS. 5 and 6, for this embodiment, in order to split 8-way platform 200 into 4-way platforms 400 and 500, the following sequence of operations are performed:

1. Indicate a hot-plug removal event to the OS for SIOH1 285;
2. Indicate a hot-plug removal event to the OS for CPU/Memory node1 (e.g., second processor substrate 210);
3. When both hot-plug removal operations are complete, the original OS is running on 4-way platform 400 comprising CPU/Memory node0 (first processor substrate 110) and SIOH0 280;
4. Program registers associated with SPS0 275 and SPS1 276 to indicate that the platform is partitioned into two;
5. Initialize the new platform 500 comprising CPU/Memory node1 (second processor substrate 210) and SIOH1 285. This platform 500 is able to run its own copy of OS and applications independent of platform 400.

Similarly, for merging of two 4-way platforms 400 and 500 into 8-way platform 200, the new nodes are announced to the running OS as hot-plug events. As a result, OS is able to add the hot-plugged CPU/Memory node and an I/O node (e.g., SIOH and constituent components) to the running platform 200 without any interruption to its service.

One usage of a dynamic partitioning is for rolling upgrades. Applications, other software services and even the OS require updates from time to time to either enhance functionality or to fix existing problem. Typically, in high reliability mission critical environments, the software updates should not be applied directly to the targeted platform in the field. However, testing the software update on a different server may not accurately test the real world environment in which it is deployed. Hence, the running platform is split into two using dynamic domain partitioning and the software update is applied to the newly formed partition while the original OS and software continues to run on the other partition. After sufficient testing, the partition running the old software is merged into the partition running the updated software thus accomplishing the update in an efficient and reliable manner.

II. Container Object Representation

Referring not to FIG. 7, an exemplary embodiment of representation of a container object that is representative of a node (e.g., SNC0 being interconnected to constituent components such as processors and memory) and generally consistent with ACPI standards is shown. Herein, container object 600 provides a mechanism for handling an ejection notice for hot-plug removal of SNC0 from the platform. This container object 600 provides at least information as to those devices that are constituent components of SNC0.

Herein, container object 600 of the first scalability node controller identifies its constituent components. For example, container object 600 represents SNC0 as a node including processors and memory devices as constituent components of that node. The eject (_EJ0) method 610 is invoked to eject, during a hot-plug removal of the first processor substrate or perhaps SNC0, those constituent components of SNC0. This occurs before SNC0 is ejected. For this embodiment, since SNC0 is coupled to processors and memory, container object 600 comprises a hardware identification (_HID) object 620, a proximity (_PXM) object 630, a processor object 640, and a device object 650. Each processor or device object 640 and 650 may be generally referred to as a "component object."

As shown in FIG. 7 the _HID object 620 contains a string for identifying the device type associated with the container object to the OS for power management and configuration. As an example, for this embodiment, the _HID object 620 would return the value of "ACPI0004" to identify SCN0 as a node.

The _PXM object 630 is used to describe proximity domains (i.e., groupings of devices) within the platform. In other words, the _PXM object 630 provides an integer that identifies a device as belonging to a specific proximity domain. The OS assumes that two devices in the same proximity domain are coupled and tends to allocate memory to those processors within the same proximity domain as the memory. For instance, SNC0 may be assigned "0" to denote that it is in a first domain while SNC1 would be assigned "1" to denote that it is in a secondary domain.

The processor object 640 is used to identify which processor(s) constitute components associated with SNC0. Similarly, device object 650 is used to identify other devices (e.g., memory) that constitute components associated with SNC0.

By using the container object representation, the OS can easily determine the components that belong together and thereafter is able to optimize memory allocations and other operations. Moreover, in the case of a hot-plug removal, the ejection notice is just sent to the node, which in turn propagates down to the constituent components. For example, in case of a SNC, the alternative would be to notify each processor and memory component individually each of which would be interpreted by the OS as an individual hot-plug removal operation thereby making the hot-plug removal operation inefficient. Also, during a hot-plug addition of a node, the OS brings the associated memory online before the processors are brought in attempts to allocate memory that is local to the processors.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A platform comprising:
   a memory device to store a system Basic Input/Output System (BIOS); and
   a plurality of processor substrates in communication with the memory device, the plurality of processor substrates including
   a first processor substrate including a first plurality of components and a first storage device to contain a first initialization BIOS to initialize the first plurality of components in response to hot-plug addition of the first processor substrate to the platform, and
   a second processor substrate including a second plurality of components and a second storage device to contain a second initialization BIOS to initialize the second plurality of components in response to hot-plug addition of the second processor substrate to the platform.

2. The platform of claim 1, wherein the first plurality of components of the first processor substrate include a processor cluster and a memory cluster.

3. The platform of claim 1, wherein the second initialization BIOS contained in the second storage device elects a processor from a plurality of processors implemented on the second processor substrate to act as a node boot strap processor for the second processor substrate.

4. The platform of claim 1, wherein the first initialization BIOS contained in the first storage device initializing the first plurality of components prior to notification of an operating system running on the platform of the initialized hot-plugged first processor substrate.

5. The platform of claim 2, wherein the first plurality of components of the first processor substrate further include a scalability node controller coupled to the processor cluster and the memory cluster.

6. The platform of claim 2, wherein the first initialization BIOS contained in the first storage device elects a processor from a plurality of processors associated with the processor cluster to act as a node boot strap processor for the first processor substrate.

7. The platform of claim 5, wherein the scalability node controller of the first plurality of components is coupled to local memory of the memory cluster through a plurality of communication sub-links supporting a total data throughput of at least one Gigabyte per second.

8. The platform of claim 5, wherein the scalability node controller of the first plurality of components includes a plurality of scalability port interfaces coupled to a first connector of the first processor substrate.

9. The platform of claim 8, wherein the second plurality of components of the second processor substrate further include a secondary scalability node controller including a plurality of scalability port interfaces coupled to a second connector of the second processor substrate.

10. The platform of claim 9 further comprising:

an interconnect substrate including a third connector, a fourth connector and a fifth connector, the third connector adapted to mate with the first connector of the first processor substrate and coupled to the fifth connector via a first link and a second link, the fourth connector adapted to mate with the second connector of the second processor substrate and coupled to the fifth connector via a third link and a fourth link.

11. The platform of claim 10 further comprising:

an input/output (I/O) substrate including a sixth connector coupled to the fifth connector, the I/O substrate further includes (1) a first scalability port switch coupled to the first link and the third link, (2) a second scalability port switch coupled to the second link and the fourth link, (3) a first Server Input/Output Hub coupled to the first and second scalability port switches, and (4) a second Server Input/Output Hub coupled to the first and second scalability port switches.

12. The platform of claim 11, wherein the first initialization BIOS contained in the first storage device, when executed, also establishes a communication path between the scalability node controller and at least one of the first scalability port switch and the second scalability port switch.

13. The platform of claim 11, wherein the second initialization BIOS contained in the second storage device, when executed, also establishes a communication path between the secondary scalability node controller and at least one of the first scalability port switch and the second scalability port switch.

14. A platform comprising:

a first processor substrate including a first plurality of components and a first storage device to contain a first code segment of Basic Input/Output System (BIOS) that, when executed, initializing the first plurality of components in response to hot-plug addition of the first processor substrate to the platform; and a second processor substrate including a second plurality of components and a second storage device to contain a second code segment of BIOS that, when executed, initializing the second plurality of components in response to hot-plug addition of the second processor substrate to the platform.

15. The platform of claim 14 further comprising:

an interconnect substrate including a first connector, a second connector and a third connector, the first connector being adapted to mate with a connector of the first processor substrate that is coupled to a plurality of scalability port interfaces of a first scalability node controller of the first plurality of components, the second connector being adapted to mate with a connector of the second processor substrate that is coupled to a plurality of scalability port interfaces of a second scalability node controller of the second plurality of components, and a third connector coupled to both the first connector via a first link and a second link and the second connector via a third link and a fourth link.

16. The platform of claim 14, wherein the first code segment of BIOS initializing the first plurality of components prior to notification of an operating system running on the platform of the first plurality of components upon hot-plug addition of the first processor substrate.

17. The platform of claim 15 further comprising:

an input/output (I/O) substrate including a fourth connector coupled to the third connector, the I/O substrate further includes (1) a first scalability port switch coupled to the first link and the third link, and (2) a second scalability port switch coupled to the second link and the fourth link.

18. The platform of claim 17, wherein the first code segment of BIOS, when executed, also establishes a communication path between the first scalability node controller and at least one of the first scalability port switch and the second scalability port switch.

19. The platform of claim 18, wherein the second code segment of BIOS, when executed, also establishes a communication path between the second scalability node controller and at least one of the first scalability port switch and the second scalability port switch.

20. A platform comprising:

an operating system;

an input/output (I/O) substrate including (i) a first scalability port switch, (ii) a second scalability port switch, (iii) a first server I/O hub and (iv) a second server I/O hub;

a first processor substrate including a first plurality of components in communication with the first and second scalability port switches; and a second processor substrate including a second plurality of components and circuitry to support dynamic partitioning of the platform by signaling the operating system of a hot-plug removal of the second server I/O hub and the second plurality of components to cause the operating system to configure the first scalability port switch and the second scalability port switch so as to partition the platform into a first platform including the first plurality of components and the first server I/O hub and a second platform including the second plurality of components and the second server I/O hub.

21. The platform of claim 20, wherein the second platform is able to run an updated software application independent of and without interrupting operations of the first platform.

22. The platform of claim 21, wherein the updated software application is an updated operating system.

23. A method comprising:

providing a multi-node platform under control of an operating system, the multi-node platform including a first processor substrate and a second processor substrate in communication with an input/output (I/O) substrate; and implementing a portion of a Basic Input/Output Subsystem (BIOS) on the first processor substrate to initialize components on the first processor substrate in response to hot-plug addition of the first processor substrate before joining the running operating system.

24. The method of claim 23 further comprising:

implementing a portion of the BIOS on the second processor substrate to initialize components on the second processor substrate in response to hot-plug addition of the second processor substrate before joining the running operating system.

25. The method of claim 23, wherein the components on the first processor substrate include at least two processors.

* * * * *